United States Patent [19]

Fujita et al.

[11] Patent Number: 4,913,549
[45] Date of Patent: Apr. 3, 1990

[54] METHOD AND APPARATUS FOR REALTIME-MONITORING ASTRONOMICAL OBJECT WITH SPECKLE INTERFEROMETRY

[75] Inventors: Katsuyoshi Fujita; Tamiki Takemori, both of Shizuoka, Japan

[73] Assignee: Hamamatsu Photonics Kabushiki Kaisha, Shizuoka, Japan

[21] Appl. No.: 257,674

[22] Filed: Oct. 14, 1988

[30] Foreign Application Priority Data

Dec. 22, 1987 [JP] Japan .................... 62-325983

[51] Int. Cl.$^4$ ............................ G01B 9/02
[52] U.S. Cl. ............................. 356/354
[58] Field of Search ................... 356/354

[56] References Cited

U.S. PATENT DOCUMENTS 4,563,091 1/1985 Dandliker .............. 356/354 X

OTHER PUBLICATIONS

Gough et al., "Speckle Holography", *Optica Acta.*, vol. 21, No. 3, pp. 243-254, 3/74.
Beddoes et al., "Speckle Interferometry on the 2.5 m Isaac Newton Telescope", *JOSA*, vol. 66, No. 11, pp. 1247-1251, 11/76.

*Primary Examiner*—Davis L. Willis
*Assistant Examiner*—Matthew W. Koren
*Attorney, Agent, or Firm*—Finnegan, Henderson, Farabow, Garrett and Dunner

[57] ABSTRACT

A realtime monitor of an astronomical object such as a double star using speckle interferometry comprises a TV camera for picking up an image of a star which is formed by a telescope, first means for producing an incoherent still picture of the star on the basis of an output from the TV camea, second means for producing a power spectrum of the star by converting the incoherent still picture to a coherent image and then optically Fourier-transforming it, third means for adding the consecutively produced power spectra to obtain an average power spectrum, and fourth means for controlling first, second and third means and calculating a normalized average power spectrum of an object star through dividing the average power spectrum of the object star by that of a reference star.

7 Claims, 3 Drawing Sheets

METHOD AND APPARATUS FOR REALTIME-MONITORING ASTRONOMICAL OBJECT WITH SPECKLE INTERFEROMETRY

BACKGROUND OF THE INVENTION

The present invention relates to a method and an apparatus for observing an astronomical object. More particularly, the present invention relates to a realtime monitor of an astronomical object using speckle interferometry, which is suitable for observation of a double star.

FIG. 5 is a diagrammatic cross section of the stellar speckle camera installed at KPNO (Kitt Peak National Observatory). As shown, this camera comprises: shutters 1, 6 and 10; an image plane detecting mask 2; an objective 3; an atmospheric dispersion compensation prism 4; a wavelength filter 5; an image intensifier 7; a focusing lens 8; a camera 9; a film 11; and a telescope 12. A similar layout is adopted by other image detecting optical systems used in stellar speckle interferometry.

The layout of the optical system shown in FIG. 5 is such that the Cassegrain focus of the telescope 12 coincides with a position of the image plane detecting mask 2 which is just in front of the objective 3 and that the orientation of the optical system is in alignment with the optical axis of the telescope. The function of the image plane detecting mask 2 is to determine whether right focus has been attained. The image in the focus is relayed and magnified by the microscope objective 3. The magnified image is passed through the atmospheric dispersion compensation prism 4 for compensating for the prism effect of air atmosphere. In order to compensate for the image distortion introduced on account of the change in refractive index which occurs through strata of air atmosphere, the image is passed through the prism 4 whose refractive index is changed through layers. The wave-length filter 5 is a combination of a narrow-band (10 to several tens of nanometers) filter and an ND filter and is used to select proper wavelength and adjust the quantity of light. In order to magnify the image and accomplish rapid image detection using the narrow-band filter, the gain of light intensity must be much increased. To this end, a gain of the order of $10^5$ is attained with the image intensifier 7. In order to improve the SN ratio, several hundred images in a short period are consecutively recorded with the camera 9. When taking photographic records of image, the shutter speed is adjusted to be within the range of from 10 to several tens of milliseconds and each picture developed is subjected to the optical Fourier transform and the average power spectrum on the Fourier plane is determined by multiple exposure.

If a TV camera is substituted for the photographic recording, each picture is A/D-converted in 1/60 second and written into a frame buffer memory, followed by the Fourier transform with a computer to determine the average of the power spectra of several hundred pictures.

Another approach is illustrated in FIG. 6: an astronomical speckle image is passed through a lens 21 and focused on the photocathode of an image intensifier 22; the secondary electron image emitted from the image intensifier 22 is recorded as a charge pattern on an electro-optic crystal 23 and read out with a laser beam from a laser light source 24; the readout is subjected to the optical Fourier transform and multiple-exposed on a photographic film with a camera 27 to determine the average power spectrum (see Optical Engineering, vol. 17, No. 3, May–June 1978, pp. 261–263).

The system shown in FIG. 5 involves the need to perform the Fourier transform operation on as many as several hundred pictures by photographic processing. When the TV camera is used, the Fourier transform must also be performed and it takes a considerable time to determine the average power spectrum even if the computer is utilized. The system shown in FIG. 6 also depends on time-consuming photographic processing for determining the average power spectrum. Therefore, a common problem with these systems is their inability to accomplish realtime processing.

SUMMARY OF THE INVENTION

An object, therefore, of the present invention is to provide a realtime monitor of an astronomical object using speckle interferometry that achieves realtime execution of multiple Fourier transform operations and produces a high-resolution, normalized average power spectrum image of a double star by dividing the determined average power spectrum of the double star by the average power spectrum of a reference star.

This object of the present invention can be attained by a realtime monitor of an astronomical body using speckle interferometry which includes: first means for producing a still picture from the output of a TV camera having a light-receiving surface disposed on the image plane of a telescope; second means which converts an incoherent picture image into a coherent image and Fourier-transforms the coherent image to obtain a power spectrum; third means for adding the power spectra obtained by the second means; and fourth means which controls the first, second and third means, receives the output of the third means and divides this output by the average power spectrum of a reference star that has been preliminarily picked up by the first, second and third means.

In the system of the present invention, images taken with the TV camera having the light-receiving surface disposed on the focusing plane of the telescope are successively picked up by a frame memory to form the still pictures; the still pictures are not only stored in a microchannel spatial light modulator but also read out with laser light to effect incoherent-to-coherent image conversion; the coherent images are optically Fourier-transformed to obtain the power spectra; and the spectra thus obtained are added in a frame memory and stored therein. The stored average power spectrum is divided by the average power spectrum of the reference star which has been preliminarily picked up, thereby accomplishing realtime-monitoring of the normalized average power spectrum of the double star.

Other and further objects, features and advantages of the invention will appear more fully from the following description taken in connection with the accompanying drawings.

DETAILED DESCRIPTION OF THE PREFERRED EMBODIMENT

An embodiment of the present invention is described hereinafter with reference to the accompanying drawings.

Figure 1:
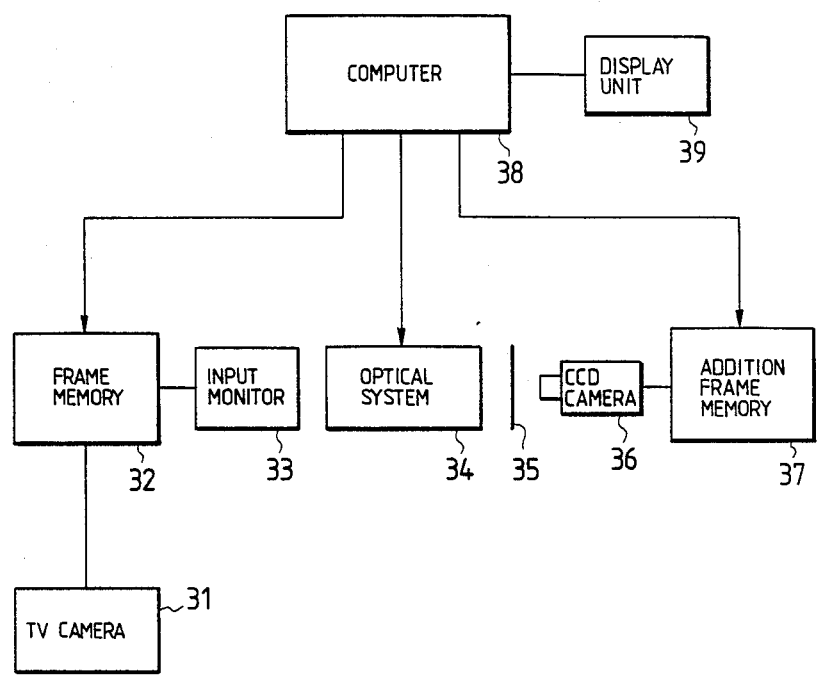
FIG. 1 is a block diagram showing schematically the basic composition of a realtime monitor of an astronomical object using speckle interferometry according to the present invention.
Figure 2:
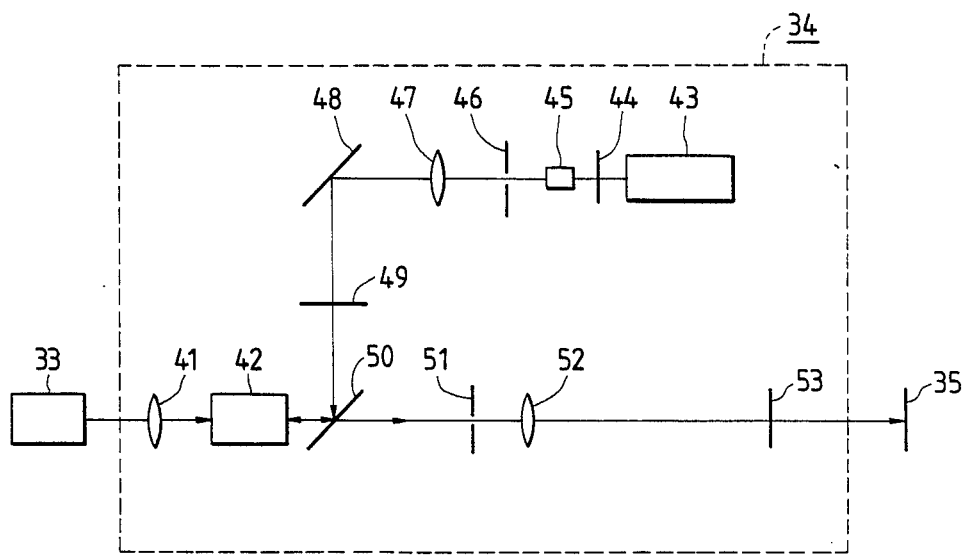
FIG. 2 shows an optical system of the realtime monitor shown in FIG. 1.
Figure 3A:
FIG. 3(a) is a photograph showing the average power spectrum of a double star.
Figure 3B:
FIG. 3(b) is a photograph showing the average power spectrum of a reference star.
Figure 3C:
FIG. 3(c) is a photograph showing the normalized average power spectrum of the double star.

FIG. 1 is a block diagram showing schematically the basic composition of a realtime monitor of an astronomical object using speckle interferometry according to the present invention. FIG. 2 is a diagram showing the optical system of the realtime monitor shown in FIG. 1. FIGS. 3(a), 3(b) and 3(c) are photographs showing the average power spectrum of a double star, the average power spectrum of a reference star, and the normalized average power spectrum of the double star, respectively. As shown in FIG. 1, the realtime monitor of the present invention consists basically of a TV camera 31 attached to a telescope, a frame memory 32, an input monitor 33, an optical system 34, a screen 35, a CCD camera 36, an addition frame memory 37, a computer 38, and a display unit 39. As shown in FIG. 2, the optical system 34 consists of lenses 41 and 47, a microchannel spatial light modulator 42, a laser light source 43, polarizers 44 and 49, an objective 45, apertures 46 and 51, a mirror 48, a half-mirror 50, a Fourier transform lens 52, and an analyzer 53.

The image of a double star taken with the TV camera 31 attached to the telescope is supplied into the frame memory 32 and displayed as a still picture on the input monitor 33. The still picture is focused with the optical system 34 and optically processed in the way to be described later in this specification. The resultant power spectrum of the still picture is projected onto the screen 35, picked up with the CCD camera 36 and written into the frame memory 37. The power spectra of double star images that are successively taken with the TV camera 31 attached to the telescope are written into the frame memory 37 where they are added and stored as an average power spectrum. FIG. 3(a) is a photograph showing the average power spectrum of a double star which was obtained by the above procedure, and the central dark spot represents the shadow produced by cutting the zero order light. The average power spectrum obtained by repeating addition operations a given number of times is forwarded to the computer 38 and therein divided by the average power spectrum of a reference star as shown in FIG. 3(b) which has been preliminarily obtained by the same procedures as described above. The result is as shown in FIG. 3(c), from which one can clearly identify the separation between fringes and their direction. As a consequence, the distance between the two stars which constitute the double star and their direction are displayed on the display unit 39.

The average power spectrum of the double star can be normalized by the following procedures. If the actual two-dimensional intensity distribution of the star is expressed by $i_o(x,y)$ and if the transfer function of the imaging system including both the telescope and atmospheric turbulence for a sufficiently short period of time that justifies negligence of time-dependent variations of atmospheric turbulence is written as $s(x,y)$, then the intensity distribution of image $i(x,y)$ can be expressed as:

$$i(x,y)=i_o(x,y)*s(x,y) \tag{1}$$

where * signifies convolution.

A Fourier transform operation on equation (1) gives:

$$I(u,v)=I_o(u,v)\cdot S(u,v). \tag{2}$$

When many photographs of the double star are subjected to the Fourier transform, the average power spectrum is determined as:

$$<|I(u,v)|^2> = |I_o(u,v)|^2<|S(u,v)|^2> \tag{3}$$

where $<\ldots>$ signifies set average.

When another star (reference star) that can be regarded as a point source of light ($i_o(x,y)=\delta(x,y)$) is found at a position close to the double star to be observed, consecutive star images in a short period may be Fourier transformed by the equation (3) to determine the average power spectrum as follows:

$$<|I'(u,v)|^2> = <|S'(u,v)|^2>. \tag{4}$$

If S and S' can be regarded statistically equivalent to each other (in practical terms, when the double star to be observed is close to the reference star and the two stars can be observed consecutively within a period ranging from several to several tens of minutes), the following relationship is established:

$$<|S|^2> = <|S'|^2>.$$

Therefore, in this case, considering the equations (3) and (4), the following equation will hold:

$$|I_o(u,v)|^2 = \frac{<|I(u,v)|^2>}{<|I'(u,v)|^2>}.$$

A detailed description of the optical system 34 is given below with reference to FIG. 2.

The still picture displayed on the monitor 33 is focused with the lens 41 on the photocathode of the microchannel spatial light modulator 42 to be described later in this specification. A charge pattern is formed on an electro-optic crystal on the output side of the modulator 42 according to the secondary electron image emitted from the photocathode. A laser beam from the laser light source 43 is passed through the polarizer 44 to have its quantity adjusted and is thereafter collimated by the combination of the objective 45, aperture 46 and lens 47. A linearly polarized component of the laser beam is selected by the combination of the mirror 48 and polarizer 49 as a readout light and is launched into the microchannel spatial light modulator 42 via the half-mirror 50. The state of polarization of the readout light changes in accordance with the charge pattern formed on the electro-optic crystal 66 in the modulator 42. The light reflected from a charge-storing surface of the electro-optic crystal 66 passes through the aperture 51 and is optically Fourier-transformed with the Fourier transform lens 52 to obtain the power spectrum.

The power spectrum image passes through the analyzer 53 and is projected onto the screen 35.

Figure 4:
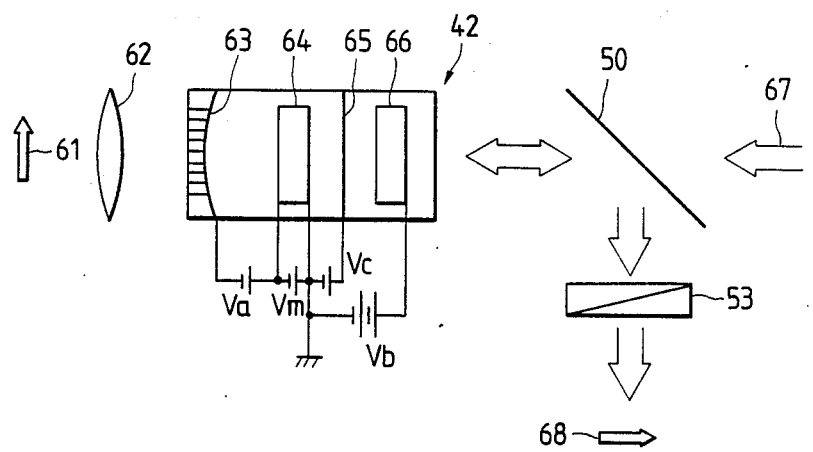
FIG. 4 shows diagrammatically the composition of a microchannel spatial light modulator.
Figure 5:
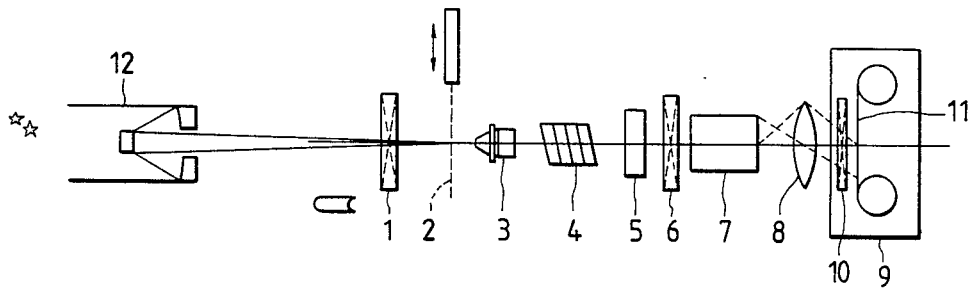
FIG. 5 is a diagrammatic cross section of the stellar speckle camera installed at KPNO.
Figure 6:
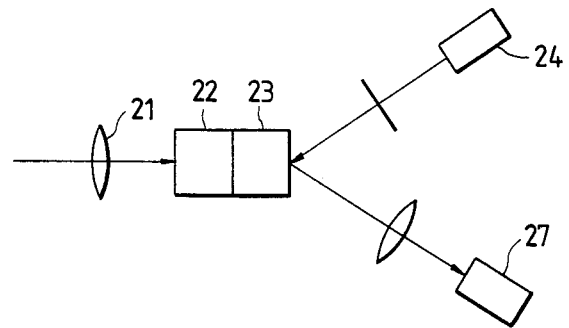
FIG. 6 shows diagrammatically a conventional apparatus for observing astronomical object using speckle interferometry.

The basic composition and operation of the microchannel spatial light modulator are described below with reference to FIG. 4. As shown, an input optical image 61 passes through a focusing lens 62 and is launched into the microchannel spatial light modulator 42 which comprises a photocathode 63, a microchannel plate 64, a secondary electron collecting electrode 65, and an electro-optic crystal 66. Numerals 67 and 68 denote coherent light and an output optical image, respectively.

After passing through the lens 62, the image originating from the input optical image 61 encounters the photocathode 63 of the microchannel spatial light modulator 42 to be converted to a photoelectron image. This photoelectron image is multiplied by the microchannel plate 64 and forms a charge pattern on the surface of the electro-optic crystal 66. The electric field traversing the crystal 66 is changed in accordance with this charge pattern, causing a change in the refractive index of the crystal 66 by the Pockels effect. When the crystal 66 is illuminated with the linearly polarized coherent light 67, the state of polarization of light reflected from the charge-storing surface of the crystal 66 will change. By making the reflected light with a change in the state of polarization pass through the analyzer 53, the output optical image 68 having a light intensity distribution associated with that of the input optical image 61 is obtained, with the incoherent image being converted into the coherent image. In this connection, it should be noted that the microchannel spatial light modulator 42 with the crystal 66 having a very high electric resistance is provided with a storage capability which permits the distribution of charges on the crystal surface to be retained for more than several days.

As described on the foregoing pages, the present invention enables the realtime execution of many Fourier transform operations which have taken a considerable time in the prior art. In addition, by means of dividing the output average power spectrum by that of the reference star, the double star and other astronomical objects can be observed within a very short period of time and yet the normalized average power spectrum image with high-resolution can be obtained.

What is claimed is:

1. An apparatus for realtime-monitoring an astronomical object with speckle interferometry, comprising:
    camera means whose light-receiving surface is disposed on an image plane of a telescope, for picking up an image of a star;
    first means for producing an incoherent still picture of said image of said star on the basis of an output from said camera means;
    second means for producing a power spectrum of said star by converting said incoherent still picture into a coherent image and optically Fourier-transforming said coherent image into said power spectrum;
    third means for picking up power spectra consecutively produced by said second means, and adding said power spectra to obtain an average power spectrum, and
    fourth means for controlling said first, second and third means and calculating a normalized average power spectrum of an object star through dividing said average power spectrum of said object star by said average power spectrum of a reference star which has been preliminarily obtained.

2. An apparatus as claimed in claim 1, wherein said second means comprises:
    a microchannel spatial light modulator for detecting said incoherent picture image to form a photoelectron image, amplifying said photoelectron image, and forming a charge pattern corresponding to an amplified photoelectron image on a charge-storing surface of an electro-optic crystal included therein; and
    an optical system including laser light source, for converting said charge pattern into said coherent image through a laser light beam which is reflected by said charge-storing surface.

3. An apparatus as claimed in claim 1, wherein said second means comprises a Fourier-transform lens for optically Fourier-transforming said coherent image into said power spectrum.

4. An apparatus as claimed in claim 1, wherein said third means comprises:
    a CCD camera for picking up said power spectra; and
    a frame memory for adding said power spectra to obtain average power spectrum and storing obtained average power spectrum.

5. An apparatus as claimed in claim 1, further comprising display means for displaying said normalized average power spectrum of said object star calculated by said fourth means.

6. A method for realtime-monitoring an astronomical object with speckle interferometry, comprising the steps of:
    picking up an image of an object star which is produced by a telescope;
    producing an incoherent still picture of said image of said object star on the basis of a picked-up image of said object star;
    producing a power spectrum of said object star by converting said incoherent still picture into a coherent image and optically Fourier-transforming said coherent image into said power spectrum;
    obtaining an average power spectrum of said object star by picking up and adding said power spectra which are consecutively produced; and
    calculating a normalized average power spectrum of said object star through dividing said average power spectrum of said object star by an average power spectrum of a reference star which has been preliminarily obtained through the above same steps.

7. A method as claimed in claim 6, further comprising the step of displaying said normalized average power spectrum of said object star.

* * * * *